(12) United States Patent
Junkins (10) Patent No.: US 12,547,224 B2
(45) Date of Patent: Feb. 10, 2026

(54) LOAD FRAME WITH LOAD BALANCED CLAMP AND ELECTRONIC DEVICE HAVING THE SAME

(71) Applicant: Advanced Micro Devices, Inc., Santa Clara, CA (US)

(72) Inventor: Andrew Thomas Junkins, Morrisville, NC (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 177 days.

(21) Appl. No.: 18/104,736

(22) Filed: Feb. 1, 2023

(65) Prior Publication Data

US 2024/0256005 A1 Aug. 1, 2024

(51) Int. Cl.
*G06F 1/18* (2006.01)
*H05K 7/14* (2006.01)

(52) U.S. Cl.
CPC ........... *G06F 1/185* (2013.01); *H05K 7/1417* (2013.01)

(58) Field of Classification Search
CPC ............... H05K 7/1417; H05K 5/006; H05K 2201/09754; H05K 2201/0999; H01L 23/4006; G01R 31/2855; G06F 1/185
USPC .................................. 361/720, 722, 723, 823
See application file for complete search history.

(56) References Cited

U.S. PATENT DOCUMENTS

| | | | | |
|---|---|---|---|---|
| 6,137,298 A | * | 10/2000 | Binns ................ | G01R 31/2886 324/750.02 |
| 6,514,097 B1 | * | 2/2003 | Conroy ................ | G01R 1/0466 439/330 |
| 7,540,745 B2 | * | 6/2009 | Lin ..................... | G01R 31/2863 324/750.05 |
| 2003/0032322 A1 | * | 2/2003 | Nakamura .......... | H01L 23/4093 361/717 |
| 2008/0024991 A1 | * | 1/2008 | Colbert ............... | H01L 23/4093 257/E23.086 |

* cited by examiner

*Primary Examiner* — Lincoln D Donovan
(74) *Attorney, Agent, or Firm* — Patterson + Sheridan, LLP (57) ABSTRACT

A load frame with a load balance clamp and electronic devices having the same are disclosed herein. The load frame is configured to simultaneously apply clamping forces to opposite sides an integrated circuit (IC) device, thus reducing potential damage to components of the IC device. In one example, a load frame includes a base, first and second clamps, and a first actuator. The base includes an open central region configured to receive an IC device. The first and second clamps are disposed on opposite sides of the open central region. The first actuator is operable to cause the first and second clamps to simultaneously clamp the IC device in the central region.

15 Claims, 8 Drawing Sheets

LOAD FRAME WITH LOAD BALANCED CLAMP AND ELECTRONIC DEVICE HAVING THE SAME

TECHNICAL FIELD

Embodiments of the present invention generally relate to a load frame with a load balanced clamp and electronic devices having the same.

BACKGROUND

Electronic devices, such as tablets, computers, copiers, digital cameras, smart phones, control systems, automated teller machines, data centers, artificial intelligence system, and machine learning systems among others, often employ electronic components which leverage chip package assemblies for increased functionality and higher component density. Conventional chip packaging schemes often utilize a package substrate, often in conjunction with a through-silicon-via (TSV) interposer substrate, to enable a plurality of integrated circuit (IC) dies to be mounted to a single package substrate. The IC dies are mounted to a top side (i.e., top surface) of the package substrate while a bottom side (i.e., bottom surface) of the package substrate is mounted to a printed circuit board (PCB) to form an electronic device. The IC dies may include memory, logic or other IC devices.

Chip packages that do not utilize an integrated heat spreader (i.e., "lidless" chip packages) often face a high risk of die edge cracking during heatsink or cold-plate assembly and disassembly processes. The assembly or disassembly process is typically performed at point of system integration and in the field during service events. The heatsinks require a force to be applied such that the base of the heatsink exerts a normal force to the IC dies within the chip package. The purpose of this force is to ensure thermal interface material functionality between the IC dies and heatsink, and to retain the heatsink to the chip package during shock events.

The force required to urge the heatsink against the IC dies is a function of the total die area and the mass of the heatsink. As this force increases, the risk of an edge of the IC dies cracking also increases. Consequently, large IC dies can have a particularly high risk of edge damage due to interaction with the heatsink.

Loading of the heatsink is conventionally accomplished using integrated spring-load screws/nuts in 2 or more locations that pass through the edges of the heatsink. Each screw generates a single and separate load force directly at the location that the screw passes through the heatsink. Since the screws can only be tightened to load the heatsink one screw at a time, it is impossible to apply a uniform load across to the heatsink. Undesirably, installing any one screw more than another at any point in time results in non-uniform loading of the heatsink. Since the non-uniform force is transmitted to the edge of one or more IC dies with the chip package as the heatsink tilts under this non-uniform spring load, high pressure is focused on the edge of the IC die which further increases the potential for IC die edge damage. The typical method to avoid die edge cracking with this type of loading mechanism is to require the operator to incrementally install each load screw such that the maximum possible pressure on any given IC die is reduced, thereby reducing risk of cracking. This method is only as effective as the operator performing the assembly/disassembly, and cannot fully avoid the possibility of damage to the IC dies. Damage to IC dies is extremely expensive, and thus needs to be avoided.

Therefore, a need exists for an improved technique for biasing a heatsink against an IC die of a chip package.

SUMMARY

A load frame with a load balance clamp and electronic devices having the same are disclosed herein. The load frame is configured to simultaneously apply clamping forces to opposite sides an integrated circuit (IC) device that includes a heatsink and chip package, thus reducing potential damage to components of the IC device.

In one example, a load frame includes a base, a first clamp, a second clamp, and a first actuator. The base includes an open central region that is configured to receive an integrated circuit (IC) device. The first and second clamps are disposed on opposite sides of the open central region. The first actuator is operable to cause the first and second clamps to simultaneously clamp the IC device in the open central region. In some examples, the IC device is clamped in a socket by the first and second clamps. In some examples, a lid or heatsink of the IC device is clamped in an IC die of the IC device by the first and second clamps.

In one example, a load frame is mounted to a substrate that includes a plurality of exposed electric contacts. The load frame includes a first clamp, a second clamp, and a first actuator. The first and second clamps are disposed on opposite sides of the plurality of exposed electric contacts. The first actuator is operable to cause the first and second clamps to bias an integrated circuit (IC) device against and in electrical contact with the exposed electric contacts.

In another example, the first actuator of the load frame is coupled to the first and second clamps by spring members. The spring members may be torsion springs, coil springs, spring forms, stretchy cables, and the like.

In another example, the first actuator is operable to cause the force applied by the first and second clamps to opposite sides of the IC device to change simultaneously.

In another example, the first actuator is operable to cause the forces applied by the first and second clamps to opposite sides of the IC device to be substantially the same.

In another example, the load frame includes a second actuator coupled to the first and second clamps. The second actuator is operable to cause the first and second clamps to apply a force to opposite sides of the IC device that is additional to the force caused by the first actuator.

In some examples of a load frame, a first actuator of the load frame may include a first tower and a second tower extending from the border region of the base between the first and second clamps. A first threaded member is removably retained to the first tower. The first threaded member is attached to a first lever arm such that displacement of the first threaded member relative the first tower causes the first lever arm to rotate about the axis and change the force exerted by the first clamp on the IC device. A second threaded member is removably retained to the second tower. The second threaded member is attached to the second lever arm such that displacement of the second threaded member relative the second tower causes the second lever arm to rotate about the axis and change the force exerted by the first clamp on the IC device.

In still another example, an electronic device is provided that includes heatsink biased against an integrated circuit (IC) die by a first clamp, a second clamp, and a first actuator. The first and second clamps are disposed on opposite sides of the heatsink. The first actuator is operable to cause the first and second clamps to bias the heatsink against a top surface of the IC die.

In still another example, an electronic device is provided that includes a printed circuit board (PCB), an integrated circuit (IC) device, and a load frame. The IC device has a first plurality of exposed electrical contacts in contact with a second plurality of exposed electrical contacts exposed on a surface of the PCB facing the IC device. The load frame is disposed on the printed circuit board. The load frame includes a base, first and second clamps and a first actuator. The base has a border region surrounding a central region. The second plurality of exposed electrical contacts are exposed through the central region of the base. The first and second clamps are disposed in the border region on opposite sides of the base, and are separated by the second plurality of exposed electrical contacts. The first actuator is connected to the first and second clamps and is operable to cause the first and second clamps to clamp the IC device within the central region of the base.

In another example, an electronic device is provided that includes an integrated circuit (IC) device biased against a plurality of exposed electric contacts by a first clamp, a second clamp, and a first actuator. The first and second clamps are disposed on opposite sides of the plurality of exposed electric contacts. The first actuator is operable to cause the first and second clamps to bias the IC device against and in electrical contact with the exposed electric contacts.

In yet another example, a method is provided for clamping a heatsink to an integrated circuit (IC) die. The method includes placing the heatsink over the IC die, and actuating a first actuator to simultaneously apply a force by clamps positioned on opposite sides of the heatsink that biases the heatsink against the IC die.

In yet another example, a method is provided for establishing electric contact between a plurality of exposed electric contacts of a socket and exposed electrical contacts of an integrated circuit (IC) device. The method includes placing the IC device in the socket, and actuating a first actuator to simultaneously apply a force by clamps positioned on opposite sides of the IC device that biases the exposed electrical contacts of the IC device against the exposed electrical contacts of the socket.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements of one embodiment may be beneficially incorporated in other embodiments.

DETAILED DESCRIPTION

Described herein is a novel load frame that mitigates the probability of IC die edge damage often associated with uneven loading of IC dies in an integrated circuit (IC) device, such as a chip packages and/or an IC die. The load frame can be advantageously used to load chip packages into sockets of electronic devices. The load frame also can be advantageously used to load a heatsink on an IC die of a chip package. The load frame advantageously uses an actuator that applies force simultaneously to opposite sides of the IC device that urges the IC device into the socket. In some embodiments, the applied force is equally applied (i.e., the same amount of force) to the opposite sides of the IC device. This provides a balanced and synchronized loading of the IC device during the assembly or disassembly process. The balanced and synchronized loading helps mitigate tipping of heatsinks of the IC device, which is a major cause of die edge cracking in conventional devices.

In some examples, two or more spring members are utilized to create the force applied to the heatsink. The spring members may be embodied in any of the socket components connecting an actuator to clamps disposed on opposite sides of the IC device. In one example, the spring members are in the form of 2 or more torsion springs. In other examples, the spring members may have other forms. The torsion springs are twisted via the actuator to generate a resultant force on two specific locations disposed on opposing sides of the IC device. The actuator twists the torsion springs disposed on opposing sides of the IC device simultaneously, which consequently applies a load on opposing sides of the IC device simultaneously. Since both sides of the IC device are loaded simultaneously, operator induced load application errors common in conventional designs are eliminated, as there is no specific order of a force actuation mechanism is required, making the socket disclosed herein more operator friendly.

In some examples, two actuators or more are utilized to clamp the chip package in a socket and/or to load a heatsink on an IC die. Each actuator is configured to independently apply a force simultaneously to opposite sides of the IC device. For example, one of the two actuators is driven, which applies an even load to opposite sides for the IC device. The second of the two actuators is then driven to evenly and simultaneously increase the load applied to opposite sides of the IC device. In this example, fully actuating a first actuator applies a first half of the full load applied to both sides of the IC device, and fully actuating a second actuator applies a second half of the full load applied to both sides of the IC device. Either of the actuators can be driven first.

Advantageously, the space consumed by the load frame described herein is similar to that of a traditional loading mechanism used apply load to an IC die with an integrated heat spreader. Thus, the configuration of the load frame does not cause a major penalty on the heatsink geometry compared to traditional designs.

Figure 1:
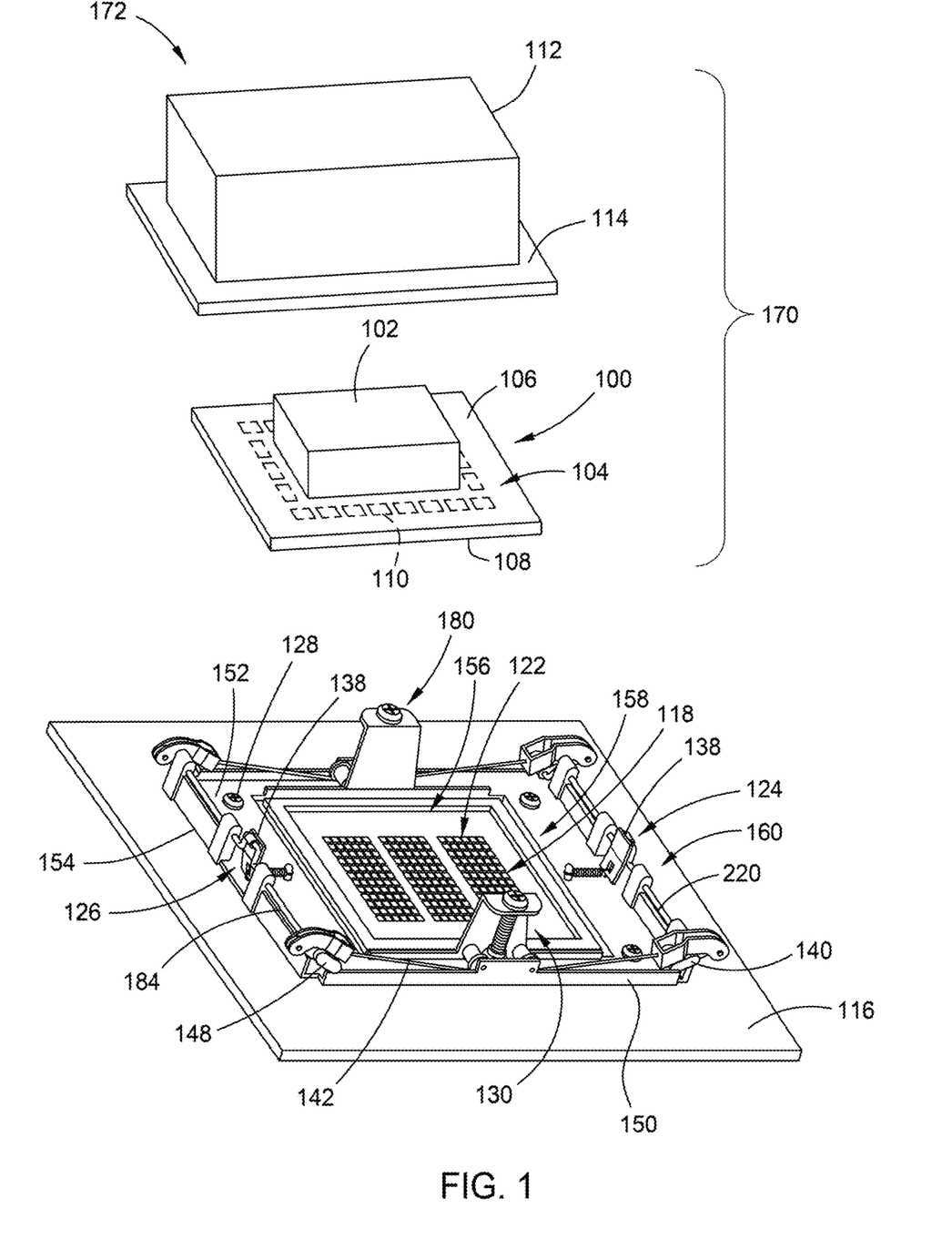
FIG. 1 is a schematic exploded isometric view of one example of an electronic device having a load frame configured to engage with a chip package.

Turning now to FIG. 1, a schematic exploded isometric view of one example of an electronic device 172 is illustrated having a load frame 160 configured to engage with a chip package 100. The chip package 100 illustrated in FIG. 1 includes one or more integrated circuit (IC) dies 102 mounted on a top surface 106 of a package substrate 104. The package substrate 104 also includes a bottom surface 108 having a plurality of exposed package contacts 110. The package contacts 110 (shown in phantom) are in electric communication through the routing circuitry of the package substrate 104 with the functional circuitry of the IC die 102. Optionally, an interposer may be disposed between the package substrate 104 and the IC die 102. Although only one IC die 102 is shown in FIG. 1, the number of IC dies 102 may range from one to as many as can be fit within the chip package 100. The IC die 102 may be a programmable logic device, such as field programmable gate array (FPGA), memory device, optical device, a logic device, processor, math engine, or other IC logic structures. Optical devices include photo-detectors, lasers, optical sources, and the like. In the embodiment depicted in FIG. 1, the IC die 102 is mounted to the top surface 106 of the package substrate 104 by solder connections (not shown).

In some examples the load frame 160 is used to clamp a heatsink 112 to the chip package 100. Optionally, the load frame 160 may be used to secure the chip package 100 in a socket 118 that is disposed inside the load frame 160. Although in many of the examples described below includes the socket 118, it is to be understood that the socket 118 is optional.

In the example depicted in FIG. 1, the plurality of exposed package contacts 110 disposed on the bottom surface 108 of the package substrate 104 are configured to electrically contact a plurality of socket contacts 122 exposed in the socket 118. Stated differently, the package contacts 110 have an arrangement that is a mirror image of the arrangement of the socket contacts 122 to that individual pairs of contacts 110, 122 make electrical connection when the IC device 170 is disposed in the socket 118.

The load frame 160 is mounted to a printed circuit board (PCB) 116, in one example, by fasteners 128. The load frame 160 generally includes a base 150 having a top surface 152 and a bottom surface 154. The top surface 152 has a border region 158 that circumscribes a central region 156. The central region 156 is sized to receive at least one of the IC die 104 or the package substrate 104 of the chip package 100. In one example, the IC die 104 or the package substrate 104 of the chip package 100 is electrically and mechanically connected to the PCB 116 in the central region 156. In another embodiment, the central region 156 is sized to receive the socket 118 in which at least one of the IC die 104 or the package substrate 104 of the chip package 100 is mounted. In the example depicted in FIG. 1, the socket 118 is present inside the load frame 160 such that the plurality of socket contacts 122 are exposed in the central region 156 of the load frame 160. The exposed socket contacts 122 are configured to align and mate with the plurality of package contacts 110 exposed on the bottom surface 154 of the chip package 100. When the plurality of package contacts 110 of the chip package 100 are urged in electrical and physical contact with the exposed socket contacts 122 of the socket 118, the functional circuitry of the IC die 102 of the chip package 100 is place in electrical communication with the circuitry of the PCB 116 through the exposed socket contacts 122 of the socket 118.

The load frame 160 also includes at least two clamps 124, 126 and one or more actuators 130, 180. At least two of the clamps 124, 126 are disposed on opposite sides of the load frame 160, separated by the socket 118 and the exposed socket contacts 122. The clamps 124, 126 are disposed on the border region 158 of the base 150. The clamps 124, 126 are configured to move into contact with the chip package 100 and/or heatsink 112, applying a bias force that urges the plurality of package contacts 110 of the chip package 100 into good electrical contact with the exposed socket contacts 122 of the socket 118. Examples using a socket 118 may also have the load-frame force applied to the heatsink (then transferred to the package and to the socket). Stated differently, that load frame 160 could be deployed in a socketed application in 3 different manners: a) the load frame 160 is utilized to apply a force to a heatsink to chip package thermal interface only, with a separate mechanism to apply a load to compress the socket contacts; b) the load frame 160 is utilized to apply a force to a heatsink to chip package thermal interface, and also apply a partial load to socket contacts, with a separate mechanism to apply the other portion of the force needed to fully compress the socket contacts; and c) the load frame 160 is utilized to apply a force to a heatsink to package thermal interface, and also fully apply the load needed to compress the socket contacts. In examples in which the socket 118 is not present, the clamps 124, 126 are configured to move into contact with the heatsink 112, applying a bias force that urges the heatsink 112 into good thermal contact with the top surface of the IC die 102 of chip package 100.

Figure 2:
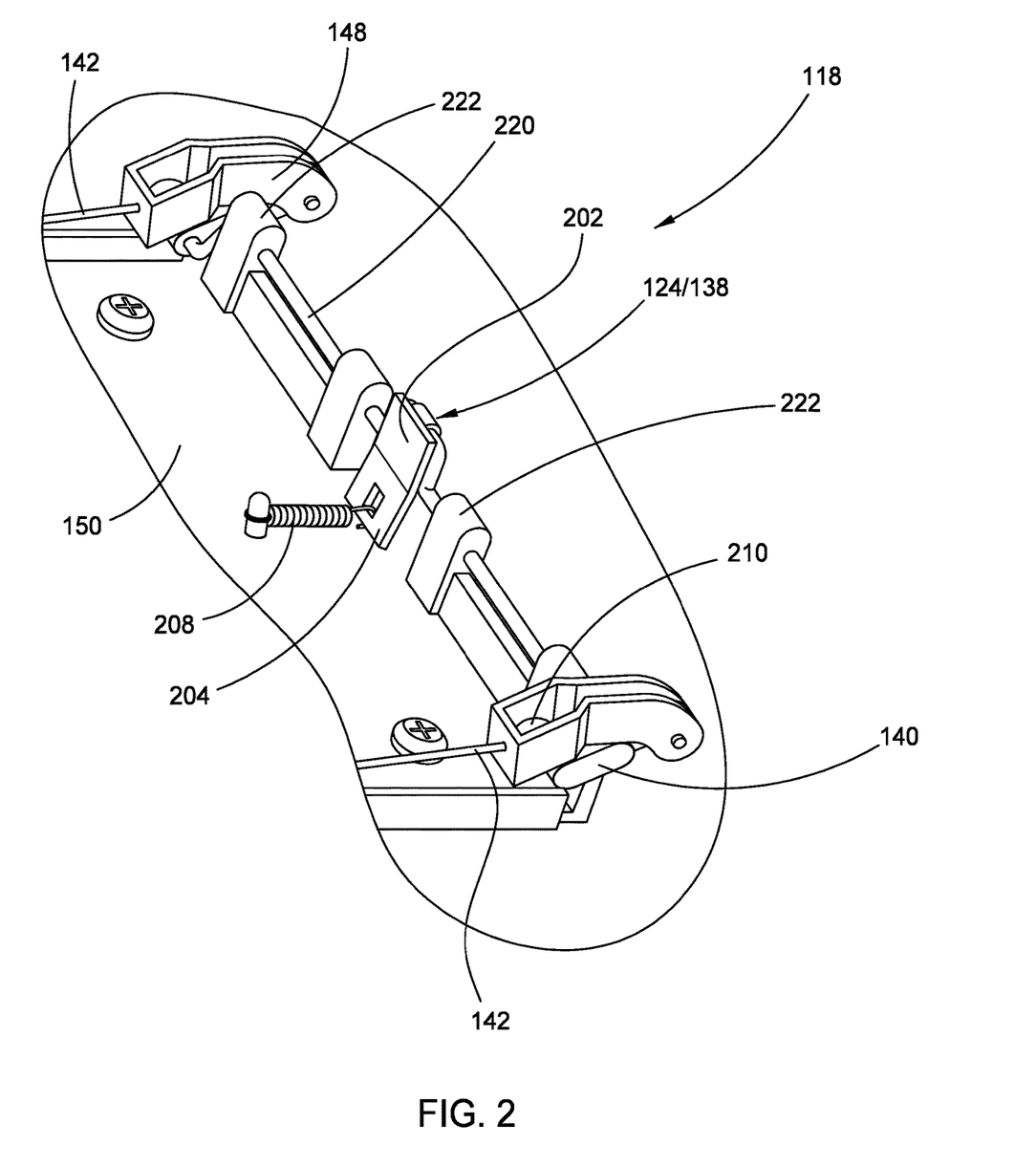
FIG. 2 is a partial schematic isometric view of one side of the load frame illustrating a first clamp.

Referring to the enlarged detail depicted in FIG. 2, one example of the first clamp 124 is illustrated that includes a first contact lever 138. The first contact lever 138 has a first end 202 and a second end 204. A first rod 220 is connected to the first contact lever 138. The first rod 220 is coupled to the base 150 of the load frame 160 by bearings 222 that allow the first rod 220 to rotate. As the first rod 220 rotates in a first direction, the first end 202 of the first contact lever 138 also rotates in the first direction inward towards the central region 156 and downward towards the socket contacts 122, which engages one or both of the IC die 102 and the heatsink 112 and urges the chip package 100 into the socket 118 and/or the heatsink 112 against the IC die 102. In one non-limiting example, the first end 202 of the first contact lever 138 engages the top of the ledge 114 extending from the sides of the heatsink 112. As the first rod 220 rotates in a second direction that is opposite first direction, the first end 202 of the first contact lever 138 rotates in the second direction outward away from the central region 156, away from the socket contacts 122 and clear of the chip package 100 and heatsink 112, which allows the chip package 100 be freely removed from the socket 118 and load frame 160. To assist rotating the first contact lever 138 in the second direction, a spring may be used.

In one example, a spring 208 connects the second end 204 of the first contact lever 138 to the base 150. The spring 208 extends when the first contact lever 138 is rotated in the first direction. The extended spring 208 generates a return force that biases the rotation of the first contact lever 138 in the second direction that rotates the first contact lever 138 clear of the chip package 100 and heatsink 112.

The force exerted by the first contact lever 138 and applied to the IC device 170 to urge the IC device 170 into the socket 118 (and/or the heatsink 112 against the IC die 102) is generated at least in part by the first actuator 130. The force may also be increased through the use of one or more spring members connecting the first clamp 124 to the first actuator 130. In one example, the spring member is a torsion spring embodied as the first rod 220. Thus, as the first rod 220 is rotated, the twist of the torsion spring (e.g., the first rod 220) generates a force that is applied through the first contact lever 138 to bias the chip package 100 into the socket 118 (and/or the heatsink 112 against the IC die 102).

The second actuator 180 is similarly coupled to the first rod 220 on the opposite side of the first clamp 124. Thus, the second actuator 180 may be actuated to rotate the first rod 220 to increase the force applied by the first clamp 124 on the IC device 170 independent of the force generated through the actuation of the first clamp 124. The second clamp 126 is similarly configured on the opposite side of the base 150.

Figure 3:
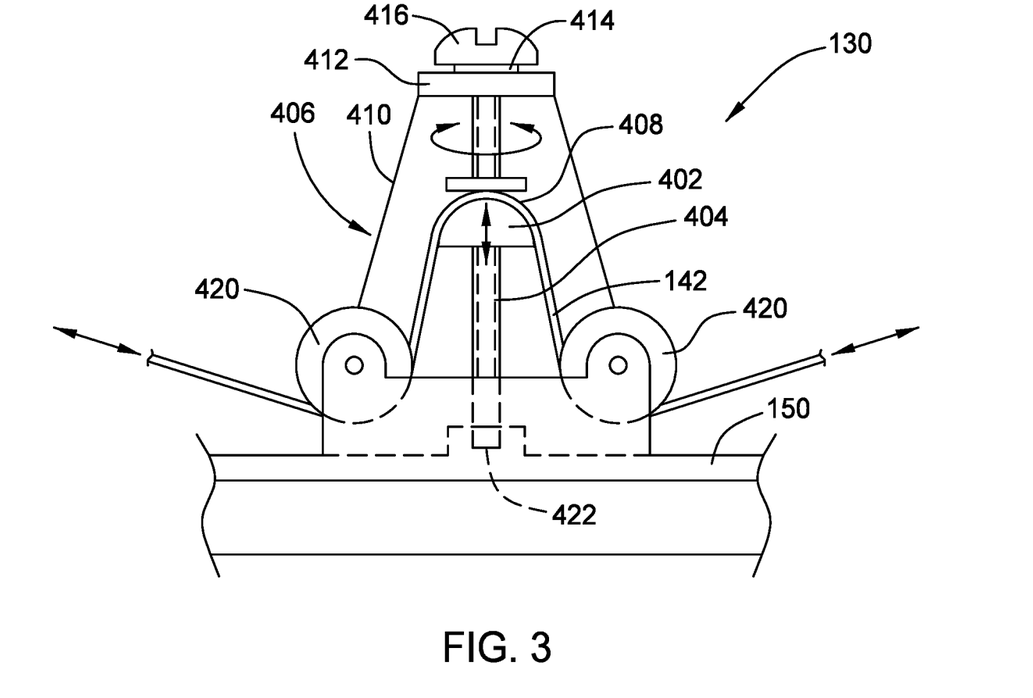
FIG. 3 is a partial schematic front view of a portion of the load frame illustrating a first actuator.

Referring back to FIG. 1, the first actuator 130 is operably connected to both the first and second clamps 124, 126. Thus, the first actuator 130 can cause the clamps 124, 126 to move between a position that clamps the chip package 100 into the socket 118 and a position clear of the chip package 100 so that the chip package 100 can be freely removed from the socket 118. In examples where a socket 118 is not present, the first actuator 130 can cause the clamps 124, 126 to move between a position that clamps the heatsink 112 against the IC die 102 and a position clear of the heatsink 112 and the IC die 102 so that the IC die 102 and heatsink 112 can be freely removed from the load frame 160. The first actuator 130 is coupled to the first and second clamps 124, 126 by one or more components that simultaneously transfers motion and/or force generated by the first actuator 130 to motion and/or force of the first and second clamps 124, 126. In the example depicted in FIG. 1, the first actuator 130 is coupled to the first and second clamps 124, 126 by a cable 142 that is connected to lever arms 140, 148. A midpoint of the cable 142 is coupled to a threaded member (lead nut) of the first actuator 130. The lead nut of the first actuator 130 is later described below with reference to FIGS. 3 and 4.

Referring now to both FIG. 1 and the partial enlarged detail of FIG. 1 depicted in FIG. 2, a first end 210 of the cable 142 is connected to the first lever arm 140. The first end 210 of the cable 142 may be connected to the first lever arm 140 using any suitable technique, such as for example a forked fitting. The first lever arm 140 is connected to the first rod 220 at a rotation axis of the first lever arm 140. The rotation axis of the first lever arm 140 is also the longitudinal centerline of the first rod 220. Thus as the first lever arm 140 rotates about the axis, the first lever arm 140 rotates the first rod 220 which in turn rotates the first clamp 124 between the clamping and clear positions. As discussed above, the force applied by the first clamp 124 may be generated through a torsional force generated by the first rod 220 when the first rod 220 is configured as a torsion spring. Alternatively or in addition to generating the force via the first rod 220 being configured as a torsion spring, the force may be generated by any one or more of the first lever arm 140 being configured as a spring form, the cable 142 being configured as an elastic cord or stretchy cable 142, the first actuator 130 itself, or other spring member including resilient components connecting the first actuator 130 to the first clamp 124.

Referring primarily back to FIG. 1, a second end of the cable 142 is connected to the second lever arm 148 in the same manner that the first end 210 of the cable 142 is connected to the first lever arm 140 as detailed above. The second lever arm 148 is connected at a rotation axis of the second lever arm 148 to the second rod 184. Thus as the second lever arm 148 rotates about the axis, the second lever arm 148 rotates the second rod 184 which in turn rotates the second clamp 126 between the clamping and clear positions. As discussed above, the force applied by the second clamp 126 may be generated through a torsional force generated by the second rod 184 when the second rod 184 is configured as a torsion spring. Alternatively or in addition to generating the force via the second rod 184 being configured as a torsion spring, the force may be generated by any one or more of the second lever arm 148 being configured as a spring form, the cable 142 being configured as an elastic cord or stretchy cable 142, the first actuator 130 itself, or other spring like or resilient component connecting the first actuator 130 to the second clamp 126.

The second actuator 180 is coupled to the base 150 on the opposite side of the socket 118 relative the first actuator 130. The second actuator 180 is configured in the mirror image of the first actuator 130, being coupled to both the first and second clamps 124, 126 by the first and second rods 220, 184. The second actuator 180 functions the same as and independently of the first actuator 130 to increase the force applied by the first and second clamps 124, 126 simultaneously to the opposite sides of the IC device 170.

Figure 4:
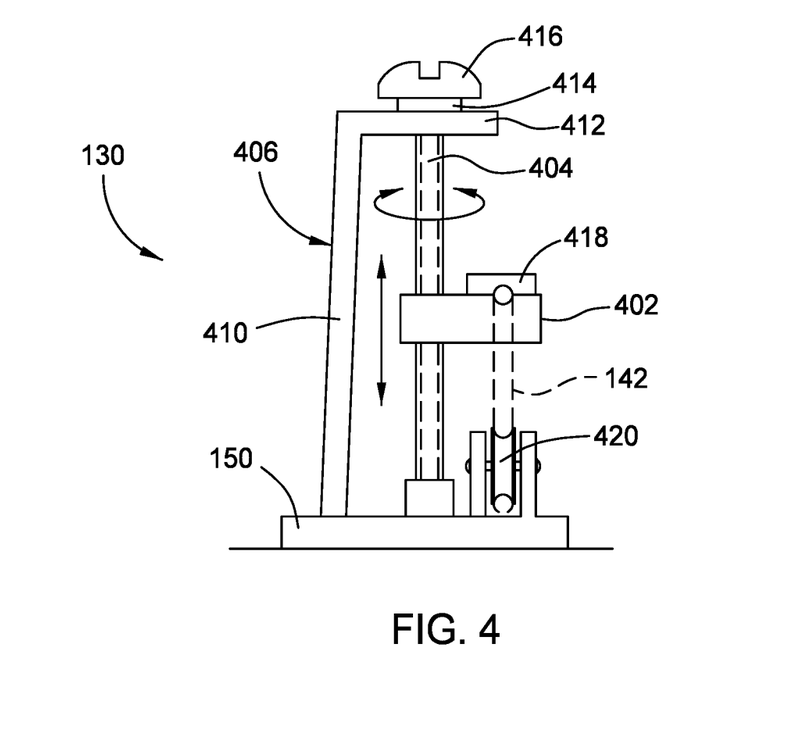
FIG. 4 is a schematic side view of the first actuator depicted in FIG. 3.

As discussed above and more clearly shown in the front and sectional views of the first actuator 130 illustrated in FIGS. 4 and 5, the midpoint 408 of the cable 142 is coupled to a lead nut (threaded member) 402 of the first actuator 130. The lead nut 402 is captured on a threaded member (lead screw) 404. The lead screw 404 is retained to a tower 406 of the first actuator 130. The tower 406 includes a sidewall 410 connected to the base 150 of the socket 118, for example in the border region 158 such that the chip package 100 can freely engage the exposed contact pads of the socket 118. The end of the tower 406 disposed farthest away from the base 150 includes a flange 412. The flange 412 is generally oriented parallel with the base 150. A bushing 414 is disposed through the flange 412. The lead screw 404 passes through the bushing 414, such that the flange 412 separates a drive head 416 of the lead screw 404 from the lead nut 402. The drive head 416 is configured to receive a driver, and may be for example a slotted head, a Phillips head, a hex socket head, a TORX head, a spanner head, or had another suitable drive receiving geometry. The distal end 422 of the lead screw 404 is secured by the base 150 of the socket 118.

As discussed above, the midpoint of the cable 142 is coupled to the lead nut 402 of the first actuator 130. The cable 142 may be coupled to the lead nut 402 via a clamp 418 or other suitable attachment technique. Optionally, the cable 142 may be split in two discrete segments, each segment having one end coupled to the lead nut 402 and the other end connected to a respective one of the first and second lever arms 140, 148 that are connected to the clamps 124, 126.

Pulleys 420 are coupled to the first actuator 130 to guide the cable 142 between the lead nut 402 and first and second lever arms 140, 148. Thus, as the lead screw 404 is rotated to advance the lead nut 402 in a vertical direction, the cable 142 is tensioned or otherwise pulled into the first actuator 130, thus pulling the lever arms 140 towards the first actuator 130 and rotating the first and second clamps 124, 126, as shown in the sequence of illustrations depicted in FIGS. 5A-5C.

Figure 5A:
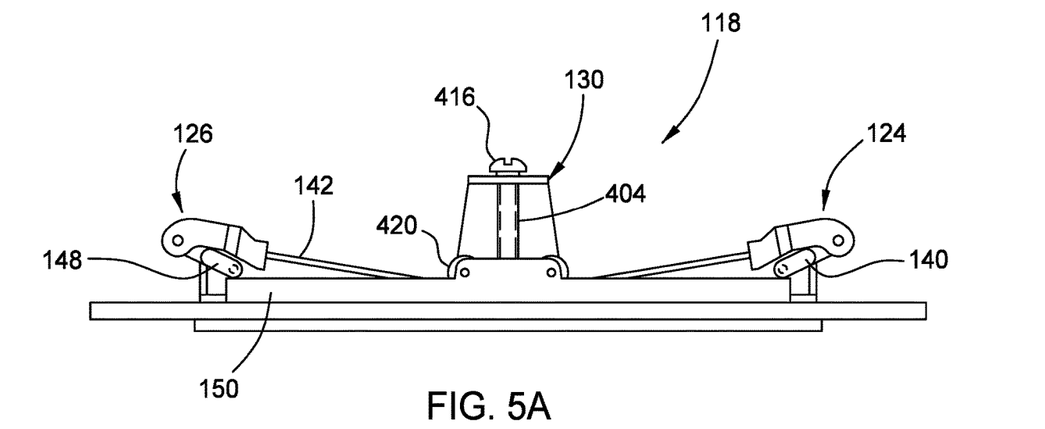
FIGS. 5A-5C are front views of the load frame during different stages of clamping a chip package.

As first shown in FIG. 5A, the first actuators 130 is in the unactuated position, with the lead nut 402 positioned close to the base 150 of the load frame 160. The second actuator 180 not shown in FIG. 5A is in a state similar to that state in which the first actuator 130 is shown. With the lead nut 402 positioned close to the base 150 of the load frame 160, the cables 142 have moved outside of the actuators 130, 180, allowing the contact levers 138 of the first and second clamps 124, 126 to be rotated clear of the interior of the load frame 160. With the contact levers 138 rotated clear of the interior of the load frame 160, the chip package 100 and the heatsink 112 can be placed into the load frame 160, as illustrated in FIG. 5B.

Figure 5B:
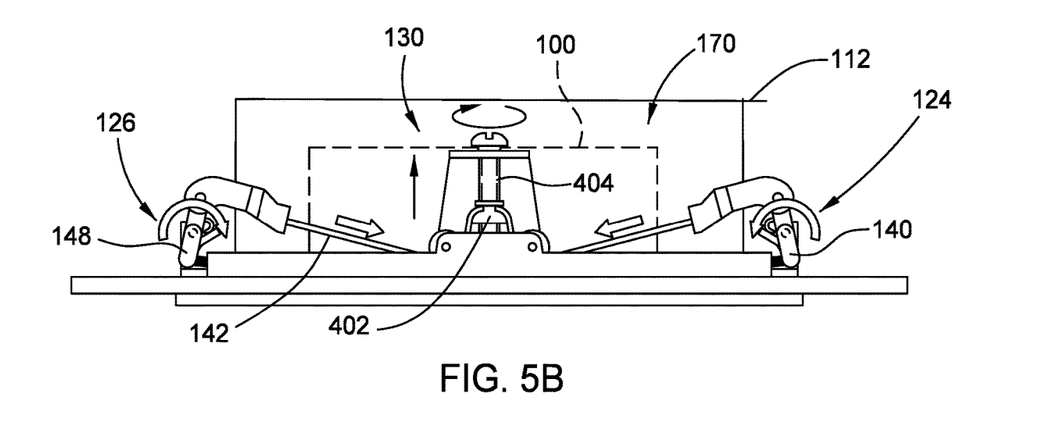

Also as illustrated in FIG. 5B, the lead screw 404 is rotated to cause the lead nut 402 to move vertically on the lead screw 404 away from the base 150, thus tensioning the cable 142. As the cable 142 is pulled through the pulleys 420 into the first clamp 124 by the motion of the lead nut 402 into the first actuator 130, the ends of the cable 142 attached to the lever arms 140, 148 cause the lever arms 140, 148 to rotate. The rotating lever arms 140, 148 rotate the contact levers 138 of the first and second clamps 124, 126 toward the interior of the load frame 160 to engage at least one of the chip packages 100 and the heatsink 112 of the IC device 170. As the contact levers 138 engage the IC device 170, for example by the ledge 114 of the heatsink 112, a spring force begins to be apply to the IC device 170 by one of more of the components connecting the first actuator 130 to the first and second clamps 124, 126. In FIG. 5B, the spring force is provided by twisting the rods 220, 184 that are configured as torsion springs by the lever arms 140.

Figure 5C:
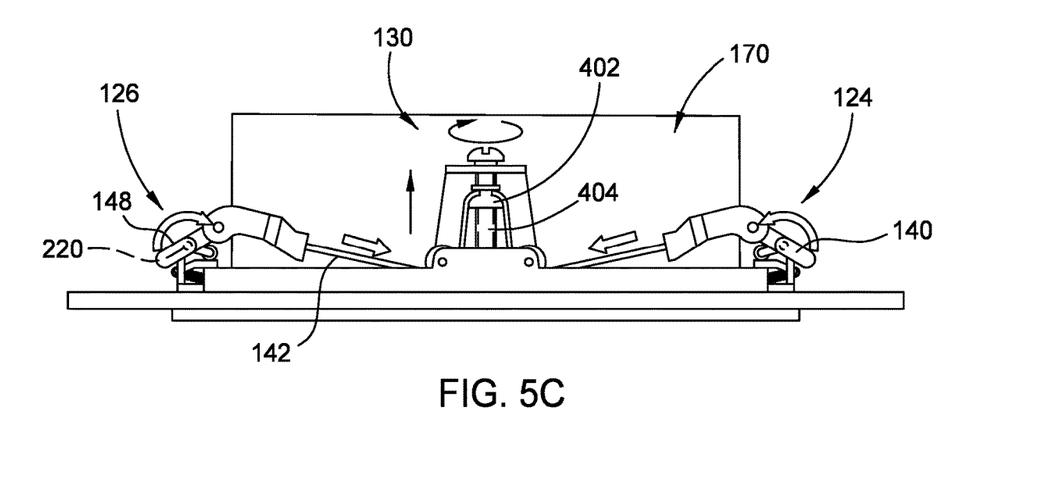

As illustrated in FIG. 5C, the lead nut 402 has further traveled along the lead screw 404 relative to that depicted in FIG. 5B, which further increases the amount of spring force applied to the IC device 170. As the cable 142 is connected to each of the clamps 124, 126, tensioning the cable 142 simultaneously applies substantially the same amount of force to opposite sides of the IC device 170 at the same time, thus substantially eliminating tilting of the heatsink 112 that frequently causes damage when conventional socket clamps are used. Furthermore, once the first actuator 130 applies the spring force to the IC device 170, the second actuator 180 can be used in the same manner as the first actuator 130 to increase the amount of force that is simultaneously applied to the opposite sides of the IC device 170. In one example, about half the force is applied to the IC device 170 using the first actuator 130 and about the other half the force applied to the IC device 170 is supplied using the second actuator 180.

Figure 6:
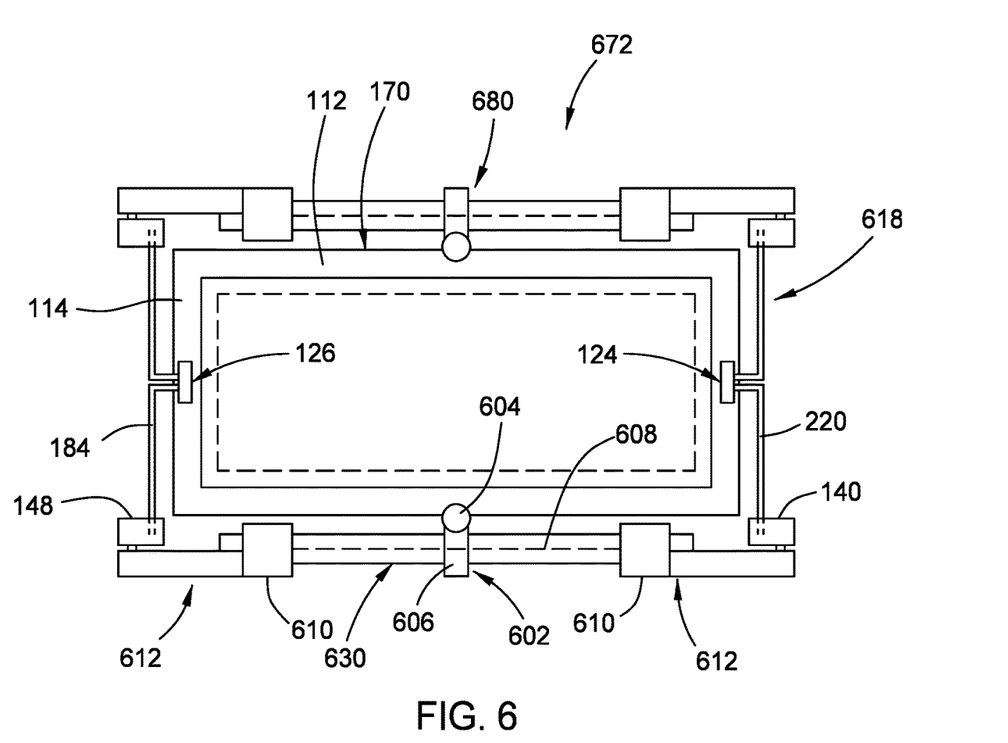
FIGS. 6-7 are top and front views of another example of an electronic device having a load frame configured to engage with a chip package.
Figure 7:
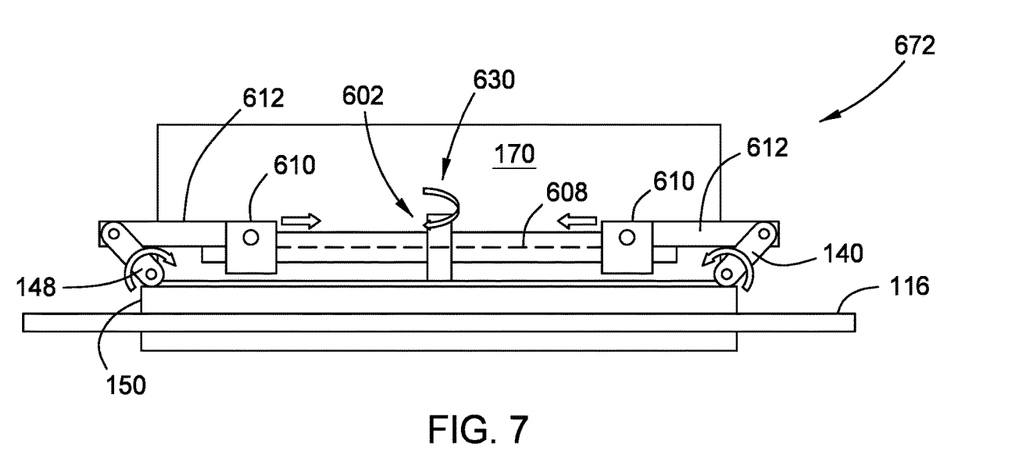

FIGS. 6-7 are top and front views of another example of an electronic device 672 having a load frame 618 configured to engage with a chip package 100 of an IC device 170. The IC device 170 is generally the same as described above. The load frame 618 may optionally circumscribe a socket 118 (not shown in FIGS. 6-7) The load frame 618 functions essentially as describe above with reference to the load frame 160, except wherein a first actuator 630 of the load frame 618 includes a gear box 602 that drives the motion of the lever arms 140, 148. In the example depicted in FIGS. 6-7, the gear box 602 is attached to the base 150 of the load frame 618 and includes a worm gear 604 and a worm wheel 606. The worm gear 604 includes a drive head not shown. The worm wheel 606 is attached to a lead screw 608. Lead nuts 610 are captured on the lead screw 608 and are driven along the lead screw 608 as the lead screw 608 is turned by rotation of the worm gear 604. The threads of the lead screw 608 and lead nut 610 are configured such that the lead nuts 610 move in opposite directions when the lead screw 608 is rotated.

Each lead nut 610 is attached by a respective linkage 612 to a respective one of the lever arms 140, 148. Thus, as both lead nuts 610 advance along the lead screw 608 simultaneously, the lever arms 140, 148 are simultaneously rotated in the same manner described above to move the clamps 124, 126 between the clear and clamping positions.

A second actuator 680 is located on the side of the load frame 618 oppose the first actuator 630. The second actuator 680 is configured generally in the mirror image of the first actuator 630, and is used to increase the force applied to the IC device 170 in the same manner as the first and second actuators 130, 180 described above.

Figure 8A:
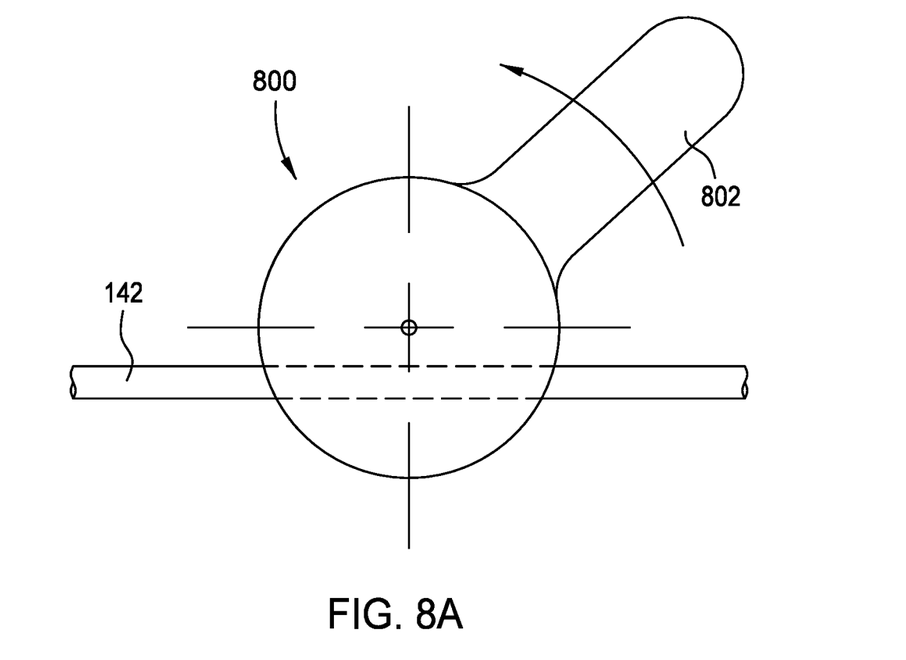
FIGS. 8A-8B are side views of another actuator suitable for clamping a chip package in a load frame of an electronic device.
Figure 8B:
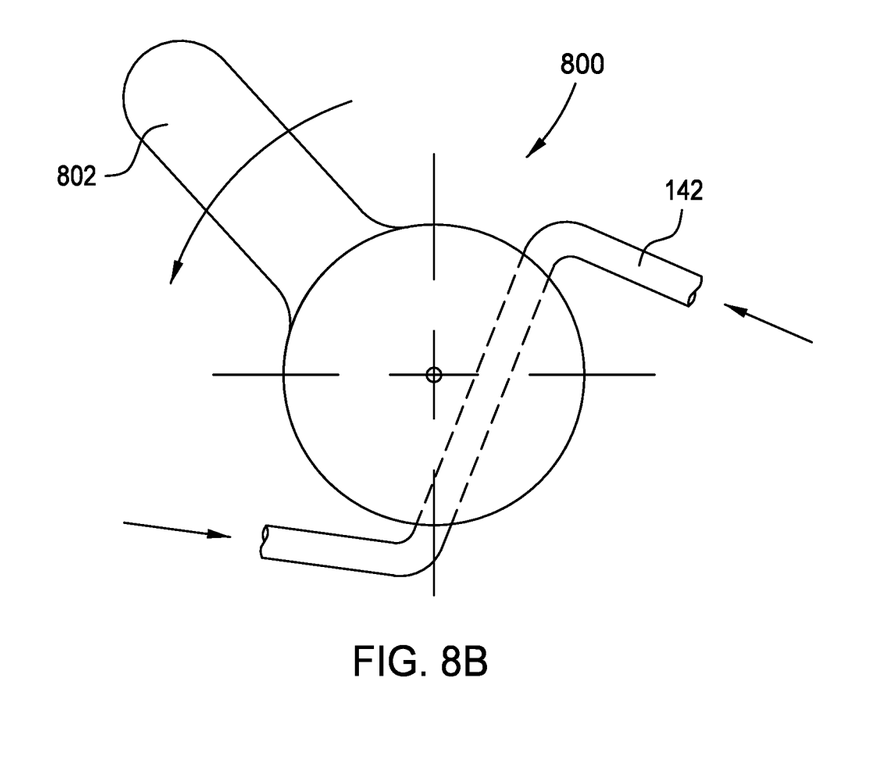

FIGS. 8A-8B are side views of another actuator 800 suitable for driving an actuator 800 of a load frame, such as either of the load frames 160, 618 of the electronic devices 172, 672 and the like. The actuator 800 is generally a lever 802 to which the midpoint 408 of the cable 142 is attached. By rotating the lever 802 of the actuator 800, the cable 142 is tensioned or fed out to rotate the rods 220, 184 as described above. The cable 142 is connected to the first and second clamps 124, 126 as described above with reference to FIGS. 1-5C. Alternatively, a rigid linkage may be utilized instead of the cable, the linkages connected to the lever 802 either side of the lever's rotational axis.

Figure 9:
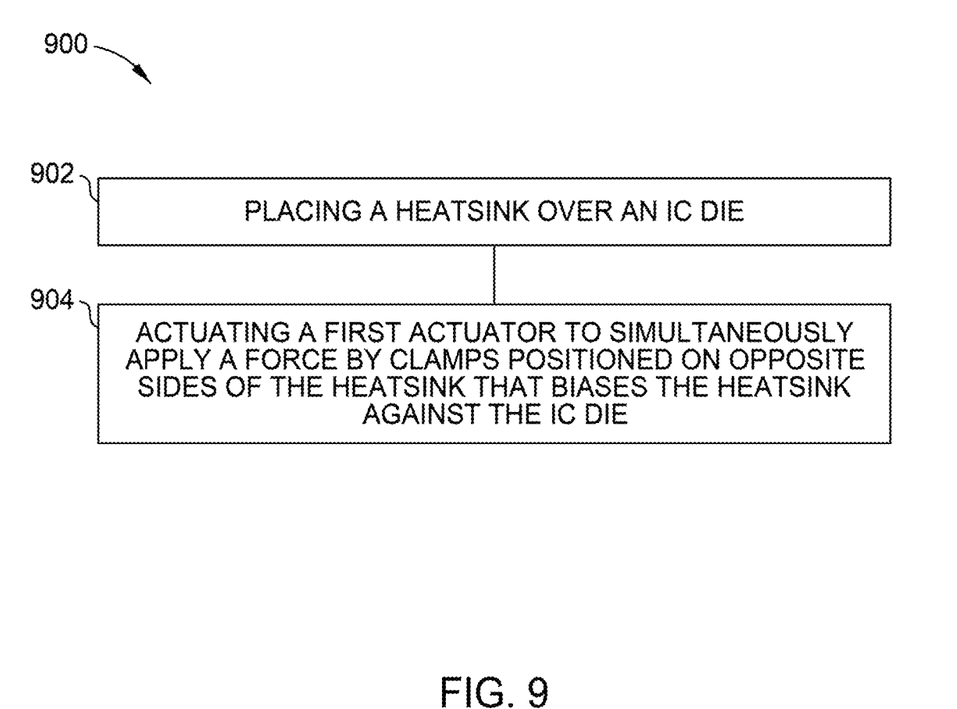
FIG. 9 is a diagram of a method for clamping a heatsink to an IC die.

FIG. 9 is a diagram of a method 900 for clamping a heatsink to an integrated circuit (IC) die. The method 900 begins at operation 902 by placing the heatsink over the IC die. The method 900 continues at operation 904 by actuating a first actuator to simultaneously apply a force by clamps positioned on opposite sides of the heatsink that biases the heatsink against the IC die. The clamps may engage the heatsink by a projecting ledge or other structure. The chip package, IC device, socket and electronic device may be as described above, or have another suitable configuration.

In one example, actuating the first actuator includes twisting torsion springs disposed on opposite sides of the IC device to generate the force applied by the clamps. In one example, the force is applied at least in part by a spring member connecting the first actuator to the first and second clamps. In one example, the spring member is a rod configured as a torsion spring. In another example, the spring member is a lever configured as a spring form. In another example, the spring member is a stretchy or elastic cable. Actuating the first actuator may also include tensioning a wire. A first end of the wire is coupled to a first torsion spring. The first torsion spring is coupled to one of the clamps. A second end of the wire is coupled to a second torsion spring that is coupled to another one of the clamps.

The method 900 may additionally include actuating a second actuator to simultaneously increase the force applied to the opposite sides of the IC device. In one example, actuating the first and second actuators includes twisting the same torsion springs disposed on opposite sides of the IC device.

Figure 10:
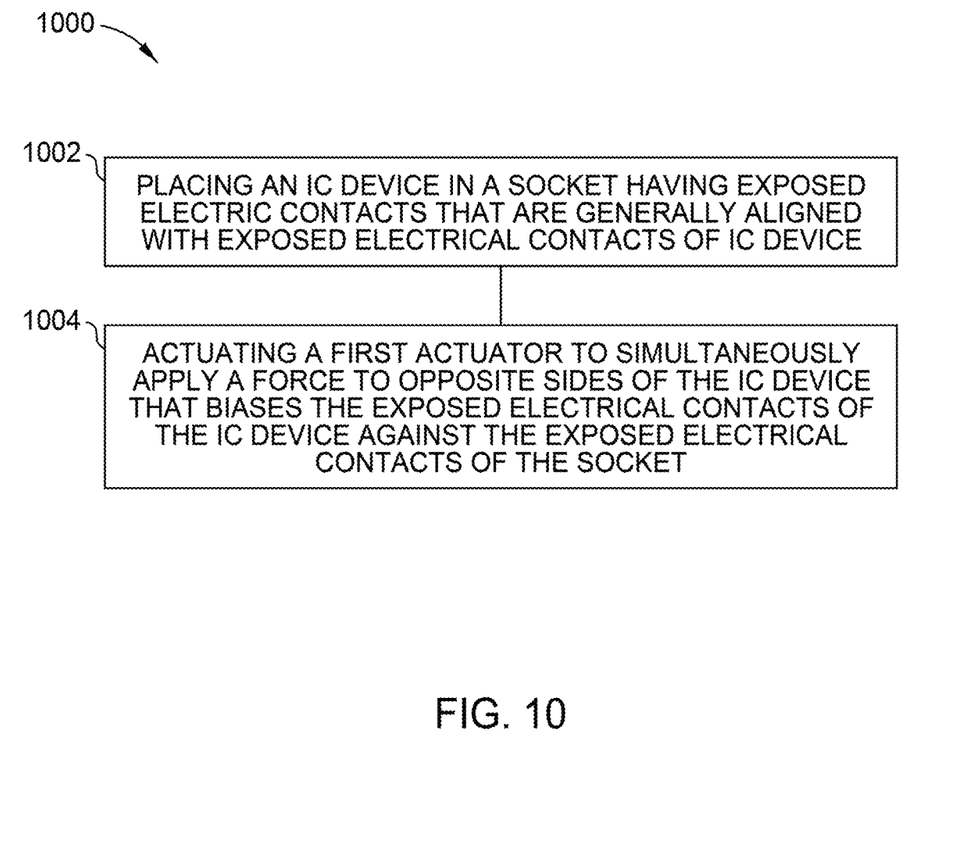
FIG. 10 is a diagram of a method for clamping a chip package of an IC device in a socket of an electronic device.

FIG. 10 is a diagram of a method 1000 for clamping a chip package of an IC device in a socket of an electronic device. The chip package, IC device, socket and electronic device may be as described above, or have another suitable configuration. The method 1000 begins at operation 1002 by placing the IC device in the socket. When the IC device is placed in the socket, the exposed electric contacts of the socket are generally aligned with the exposed electrical contacts of an integrated circuit (IC) device.

The method 1000 continues at operation 1004 by actuating a first actuator to simultaneously apply a force by clamps positioned on opposite sides of the IC device that biases the exposed electrical contacts of the IC device against the exposed electrical contacts of the socket. In one example, the actuating the first actuator includes twisting torsion springs disposed on opposite sides of the IC device to generate the force applied by the clamps. In one example, the force is applied at least in part by a spring member connecting the first actuator to the first and second clamps. In one example, the spring member is a rod configured as a torsion spring. In another example, the spring member is a lever configured as a spring form. In another example, the spring member is a stretchy or elastic cable. Actuating the first actuator may also include tensioning a wire. A first end of the wire is coupled to a first torsion spring. The first torsion spring is coupled to one of the clamps. A second end of the wire is coupled to a second torsion spring that is coupled to another one of the clamps.

The method 1000 may additionally include actuating a second actuator to simultaneously increase the force applied to the opposite sides of the IC device. In one example, actuating the first and second actuators includes twisting the same torsion springs disposed on opposite sides of the IC device. In one example the IC device may be a device under test (DUT) in a chip testing system.

Thus, the load frame and loading technique described above mitigates the probability of IC die edge damage often associated with uneven loading of an IC die of an IC device. The load frame advantageously uses a first actuator that applies force simultaneously to clamps positioned on opposite sides of the chip package or heatsink. This provide a balanced and synchronized loading of the IC device into the socket and/or a heatsink onto an IC die during the assembly or disassembly process. A second actuator may also be utilized to simultaneously increase the force applied to the clamps positioned on opposite sides of the chip package. The balanced and synchronized loading helps mitigate tipping of heatsinks of the IC device, which is a major cause of die edge cracking in conventional devices.

While the foregoing is directed to embodiments of the present invention, other and further embodiments of the invention may be devised without departing from the basic scope thereof, and the scope thereof is determined by the claims that follow.

What is claimed is:

1. A load frame comprising:
a base having a central region configured to receive an integrated circuit (IC) device and a border region surrounding the central region;
a first clamp disposed in the border region;
a first torsion spring coupled to the first clamp;
a second clamp disposed in the border region, the first and second clamps disposed on opposite sides of the base; and
a first actuator connected to the first and second clamps and operable to cause the first and second clamps to rotate toward the border region and clamp the IC device within the central region of the base, the first actuator coupled to the first clamp by the first torsion spring.

2. The load frame of claim 1, wherein the first actuator is operable to rotate the first torsion spring to apply a torsional force to the first clamp.

3. The load frame of claim 2, wherein the first torsion spring is coupled to the first actuator by a first lever arm, the first lever arm rotatable about an axis that changes a force exerted by the first torsion spring that is transferred through the first clamp to the IC device.

4. The load frame of claim 3, wherein the first actuator further comprises:
a first tower extending from the border region of the base between the first and second clamps; and
a first threaded member removably retained to the first tower, the first threaded member attached to the first lever arm such that displacement of the first threaded member relative the first tower causes the first lever arm to rotate about the axis.

5. The load frame of claim 1, wherein the first actuator is operable to cause the first and second clamps to bias opposite sides of the IC device with an equal amount of force.

6. The load frame of claim 1, wherein the first actuator is operable to cause a force applied by the first and second clamps to opposite sides of the IC device to change simultaneously.

7. The load frame of claim 2 further comprising a second actuator coupled to the base, wherein the second actuator is coupled to the second clamp by a second torsion spring.

8. The load frame of claim 2 further comprising a second actuator coupled to the base, wherein the second actuator is coupled to the first clamp by the first torsion spring.

9. The load frame of claim 8, wherein:
the first torsion spring is coupled to the first actuator by a first lever arm, the first lever arm rotatable about an axis that changes a force exerted by the first torsion spring that is transferred through the first clamp to the IC device; and wherein:
the first torsion spring is coupled to the second actuator by a second lever arm, the second lever arm rotatable to change the force exerted by the first torsion spring to the IC device.

10. The load frame of claim 1, wherein the first actuator is coupled to the first clamp by a first torsion spring and to the second clamp by a second torsion spring.

11. The load frame of claim 10, wherein a second actuator is coupled to the first clamp by the first torsion spring and to the second clamp by the second torsion spring.

12. An electronic device comprising:
a printed circuit board (PCB);
an integrated circuit (IC) device having a first plurality of exposed electrical contacts in contact with a second plurality of exposed electrical contacts exposed on a surface of the PCB facing the IC device; and
a load frame disposed on the printed circuit board, the load frame comprising:
a base having a border region surrounding a central region, the second plurality of exposed electrical contacts through the central region;
a first clamp disposed in the border region;
a first torsion spring coupled to the first clamp;
a second clamp disposed in the border region, the first and second clamps disposed on opposite sides of the base and separated by the second plurality of exposed electrical contacts;
a second torsion spring coupled to the second clamp; and
a first actuator connected to the first and second clamps and operable to cause the first and second torsion springs to apply a torsional force to the first and second clamps to clamp the IC device within the central region of the base.

13. The electronic device of claim 12, wherein the IC device comprises:
a chip package, the first and second clamps urging the chip package against the second plurality of exposed electrical contacts.

14. The electronic device of claim 13, wherein the second plurality of exposed electrical contacts are disposed in a socket secured to the PCB.

15. The electronic device of claim 12, wherein the IC device comprises:
   a chip package; and
   a heatsink disposed on the chip package, the first and second clamps engaging the heatsink.

\* \* \* \* \*